United States Patent
White et al.

(10) Patent No.: US 6,837,644 B2
(45) Date of Patent: Jan. 4, 2005

(54) DUAL SHAFT AND ROTATING MACHINE COUPLING

(75) Inventors: Michael Walter White, Peterborough (CA); Peter Truman, Peterborough (CA)

(73) Assignee: General Electric Canada Inc., Mississauga (CA)

( * ) Notice: Subject to any disclaimer, the term of this patent is extended or adjusted under 35 U.S.C. 154(b) by 55 days.

(21) Appl. No.: 10/448,279

(22) Filed: May 30, 2003

(65) Prior Publication Data

US 2003/0228188 A1 Dec. 11, 2003

(30) Foreign Application Priority Data

Jun. 6, 2002 (CA) .............................................. 2839483

(51) Int. Cl.⁷ ................................................ F16D 1/00
(52) U.S. Cl. ...................... 403/337; 464/179; 336/120
(58) Field of Search ................................ 336/115–120; 310/254–269; 464/179–183; 403/335–337, 343

(56) References Cited

U.S. PATENT DOCUMENTS

| | | | | |
|---|---|---|---|---|
| 1,332,966 A | * | 3/1920 | Werner ........................ 310/112 |
| 2,585,113 A | | 2/1952 | Gredell | |
| 2,676,279 A | | 4/1954 | Wilson | |
| 2,756,018 A | | 7/1956 | Casacci | |
| 3,524,090 A | | 8/1970 | Sark | |
| 3,858,987 A | | 1/1975 | Kleinhans et al. | |
| 4,014,599 A | | 3/1977 | Bogdanov et al. | |
| 4,083,639 A | * | 4/1978 | Terry ............................ 403/16 |
| 4,134,699 A | | 1/1979 | Schafer et al. | |
| 4,152,099 A | * | 5/1979 | Bingler ........................ 417/420 |
| 4,318,281 A | | 3/1982 | Cutler et al. | |
| 4,407,602 A | | 10/1983 | Terry, Jr. | |
| 4,541,817 A | | 9/1985 | Sawabe et al. | |
| 4,607,971 A | | 8/1986 | Hartmann et al. | |
| 4,722,717 A | | 2/1988 | Salzman et al. | |
| 5,421,781 A | | 6/1995 | Mackellar | |
| 5,441,358 A | | 8/1995 | King | |
| 5,651,629 A | | 7/1997 | Wall et al. | |
| 5,917,259 A | | 6/1999 | Stridsberg | |
| 5,924,929 A | * | 7/1999 | Silver .......................... 464/97 |
| 5,953,225 A | | 9/1999 | Larsen | |
| 6,171,195 B1 | | 1/2001 | Ferguson | |

FOREIGN PATENT DOCUMENTS

| | | |
|---|---|---|
| CA | 2174259 | 12/2000 |
| CA | 2351895 A1 | 12/2001 |
| FR | 1004611 | 4/1952 |

* cited by examiner

Primary Examiner—Tuyen T. Nguyen

(57) ABSTRACT

A dual shaft and rotating machine coupling has a first rotatable shaft, a second rotatable shaft and a rotating machine rotor coupling. The first rotatable shaft has a first shaft connecting flange radially extending outwardly therefrom. The second rotatable shaft is axially aligned with the first rotatable shaft and has a second shaft connecting flange radially extending outwardly therefrom. The second shaft connecting flange is spaced from the first shaft connecting flange. The rotating machine rotor coupling has a rotor spider and a rotor connecting flange radially extending inwardly from the spider securely sandwiched between and in abutting relation with the first and second shaft connecting flanges.

18 Claims, 2 Drawing Sheets

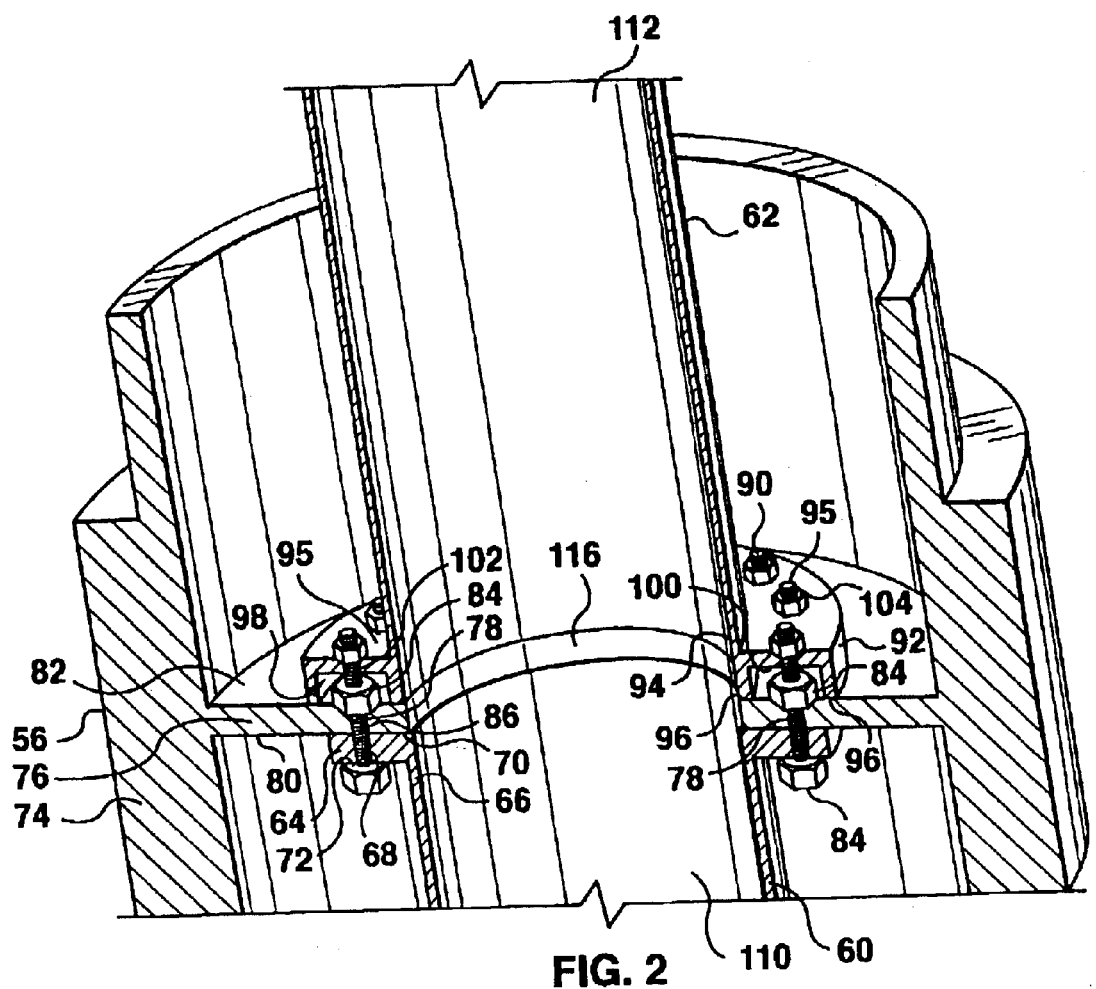
FIG. 2
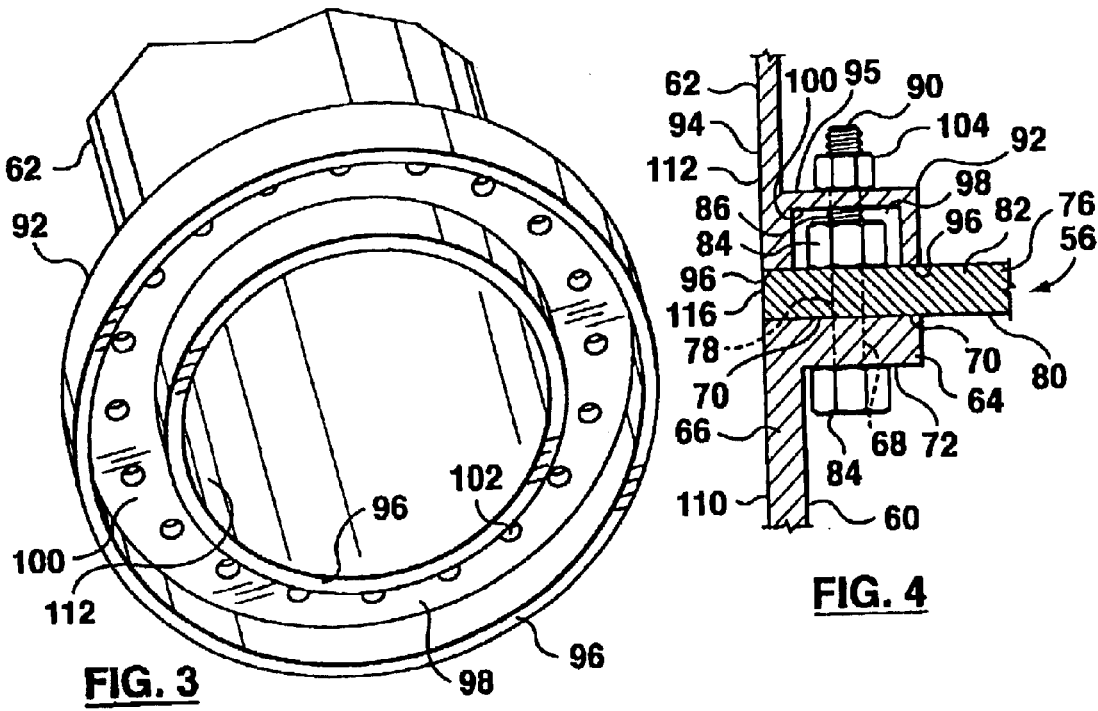
FIG. 3
FIG. 4

DUAL SHAFT AND ROTATING MACHINE COUPLING

FIELD OF THE INVENTION

The present invention relates to a dual shaft and rotating machine coupling and, in particular, relates to a dual shaft and drive motor coupling utilized in a high power rotary transformer system.

BACKGROUND OF THE INVENTION

A high power rotary transformer may be utilized to transform electrical power from one power grid operating at one frequency to a second power grid operating at a second frequency. U.S. Pat. No. 5,953,225 issued Sep. 14, 1999 to Larsen discloses a rotary transformer that includes a power recovery system to recover and apply to the transferee grid a power differential attributable to mechanical power channeled to a rotatable shaft of the rotary transformer.

Another such rotary transformer assembly is disclosed in Canadian patent application serial number 2,351,895 published Dec. 30, 2001 to Martin and Rehder. This rotary transformer assembly utilizes three phases of isolated bus duct passing through the center of the rotating shaft to connect the rotor of the rotary transformer to one of the two power systems between which the rotary transformer transforms the electrical power from one system through a stator to the other system operating at a slightly different frequency. Both shaft sections are coupled together by a coupling flange. The rotor of the rotary transformer is supported on the lower shaft section. The power recover system includes a drive motor connected to the upper shaft section between the two sets of leads of the bus duct. The drive motor applies torque to the upper shaft portion to recover power relatively close to lower exit lead openings for the bus duct.

In recent developments, it has been determined that it is more preferred to have the bus duct extend through the lower shaft as well the upper shaft so that the upper shaft is not weakened when the drive motor applies torque to the upper shaft. This has further resulted in a need for modifications to the drive motor coupling to the upper rotor shaft to compensate for a shaft that might otherwise be damaged, weakened, or broken during a short circuit of the drive motor or other short circuit conditions

SUMMARY OF THE INVENTION

The present invention relates to a dual shaft and rotating machine coupling where the rotating machine coupling is effectively sandwiched between two dual aligned shafts used in the overall shaft system.

In particular, the present invention relates to a dual shaft and rotating machine coupling comprising a first rotatable shaft, a second rotatable shaft and a rotating machine rotor coupling. The first rotatable shaft has a first shaft connecting flange radially extending outwardly therefrom. The second rotatable shaft is axially aligned with the first rotatable shaft and has a second shaft connecting flange radially extending outwardly therefrom. The second shaft connecting flange is spaced from the first shaft connecting flange. The rotating machine rotor coupling has a rotor spider and a rotor connecting flange radially extending inwardly from the spider securely sandwiched between and in abutting relation with the first and second shaft connecting flanges.

The present invention satisfies the need that arises in applications where it is necessary to couple the rotor of an electromechanical device, such as, for example, an electric generator or motor; or the rotor of a mechanical device, such as, for example, a fan or pump; to a shaft system where it is not possible to pass all or part of the shaft through the centre of a coupling flange on the rotor. Shaft coupling flanges are typical obstructions on the shaft that prevent it from being passed through the coupling flange on the rotor. The present invention resloves this problem by splitting the shaft at the rotor coupling flange, thereby sandwiching the rotor coupling flange between the two shafts and eliminating the need to pass a portion of either shaft through the rotor coupling flange.

In effect, the present invention acts as a through-shaft connecting to the rotor coupling flange, without the need to pass any portion of the shaft through the centre of the rotor flange. As such, the present invention permits the coupling of the rotating machine rotor to a two-piece through-shaft containing obstructions on either side of the rotor coupling location that are larger in diameter than the inside diameter of the rotor coupling flange. Such a coupling is not possible with a one-piece through shaft.

A detailed description of the present invention is given in the following paragraphs. For the purpose of these descriptions, reference will be made to a line at the mid-axial point of the rotating machine rotor coupling flange. Hence, when reference is made to the axially outer surface of a coupling component this represents the component surface that is farthest away from the rotor coupling flange along the centreline axis of the shaft, whereas the axially inner surface is that closest to the rotor coupling flange.

The dual shaft and rotating machine coupling of the present invention comprises a first rotatable shaft having a first shaft connecting flange radially extending therefrom. The first shaft connecting flange has opposing first axially inner and axially outer surface portions. The rotor of the rotating machine has a coupling flange disc that extends radially inward from the outer portion of the rotor, also known as the rotor spider. The rotor connecting flange has opposing first and second surface portions extending perpendicular to the centreline of the shaft system. The coupling has a plurality of coupling studs extending in the axial direction from the first shaft connecting flange through the rotor connecting flange. Each coupling stud has a coupling fastener, preferably a nut, mounted thereon against the second surface portion of the rotor connecting flange to couple the first surface portion of the rotor connecting flange to the first axially inner surface portion of the first shaft connecting flange. The coupling has a second rotatable shaft axially aligned with the first rotatable shaft. The second rotatable shaft has a second shaft connecting flange radially extending therefrom. The second shaft connecting flange has a second axially outer surface portion and a pair of co-planar axially inner surface portions radially spaced from each other by a groove providing a recessed axially inner surface portion spaced from the co-planar surface portions by a predetermined distance. Contact between the second rotatable shaft and the second surface of the rotor connecting flange occurs through the pair of co-planar axially inner surfaces on the second shaft coupling flange. The size of the groove in the second rotatable shaft coupling flange, in both the axial and radial directions, is defined by the size of the coupling nuts in contact with the second surface portion of the rotor connecting flange. The groove in the second rotatable shaft coupling flange is sufficiently deep that this flange does not contact the coupling nuts sitting on the second surface portion of the rotor connecting flange. The coupling has additional fasteners, preferably nuts each fastened to the coupling studs and against the second axially outer surface portion of the second shaft connecting flange to couple the second shaft connecting flange to the rotor connecting flange.

Coupling of the rotor to the shafts is done in two steps. First, the first rotatable shaft is coupled to the rotor connecting flange using the coupling studs, and nuts that are in contact with the second surface portion of the rotor connecting flange. It should be understood that access for performing this coupling is ample because the second rotatable shaft is not in-place at this time. Next, the second rotatable shaft is coupled to the rotor connecting flange using the same coupling studs for the first coupling, and the additional coupling nuts that make contact with the second axially outer surface portion of the second shaft connecting flange. Access for this coupling is rather limited as the second shaft is now in place, which leaves only the space between the outside of the second shaft and inside of the rotor for performing the coupling. As such, it would be advantageous to locate the rotor connecting flange towards the axial end of the rotor to which the second rotatable shaft is connected to increase the access to the second shaft coupling nuts.

Preferably, the coupling is utilized in a rotary transformer system to interconnect two power grids. The rotary transformer system comprises a first hollow rotatable collector shaft connected to a second hollow rotatable rotor shaft of the rotary transformer through the machine coupling. The rotating machine is a dynamoelectric machine, and is preferably a direct current drive motor, whose rotor is coupled through to the dual shafts to drive the shafts proportional to power compensation between the first and second grids.

Preferably, the first and second shaft connecting flanges radially extend from respective end portions of the first and second rotatable shafts. Also, the first and second shaft connecting flanges are annular in shape and respectively extend radially outward of the first and second shafts. The rotor connecting flange is preferably annular in shape and extends radially inward of the rotor spider portion.

Preferably the first and second shafts have an inner wall of a predetermined diameter and the rotor connecting flange has an inner diameter corresponding to said predetermined diameter, with an appropriate allowance on diameter for the inclusion of coupling flange spigots. The first and second shaft connecting flanges have outer diameters less than the outer diameter of the rotor connecting flange. It should be noted that the larger the difference between the outer diameter of the shaft connecting flanges and the outer diameter of the rotor flange, the more room there is available for performing the coupling between the second rotatable shaft and the rotor connecting flange.

BRIEF DESCRIPTION OF THE DRAWINGS

For a better understanding of the nature and objects of the present invention reference may be had to the accompanying diagrammatic drawings in which:

FIG. 2 is partial perspective sectional view showing the dual shaft and motor coupling of the present invention.

FIG. 3 is a perspective view of the one of the shafts utilized in the present invention.

FIG. 4 is a side sectional partial view showing the coupling of the dual shafts and motor coupling of the present invention.

DETAILED DESCRIPTION OF THE INVENTION

Figure 1:
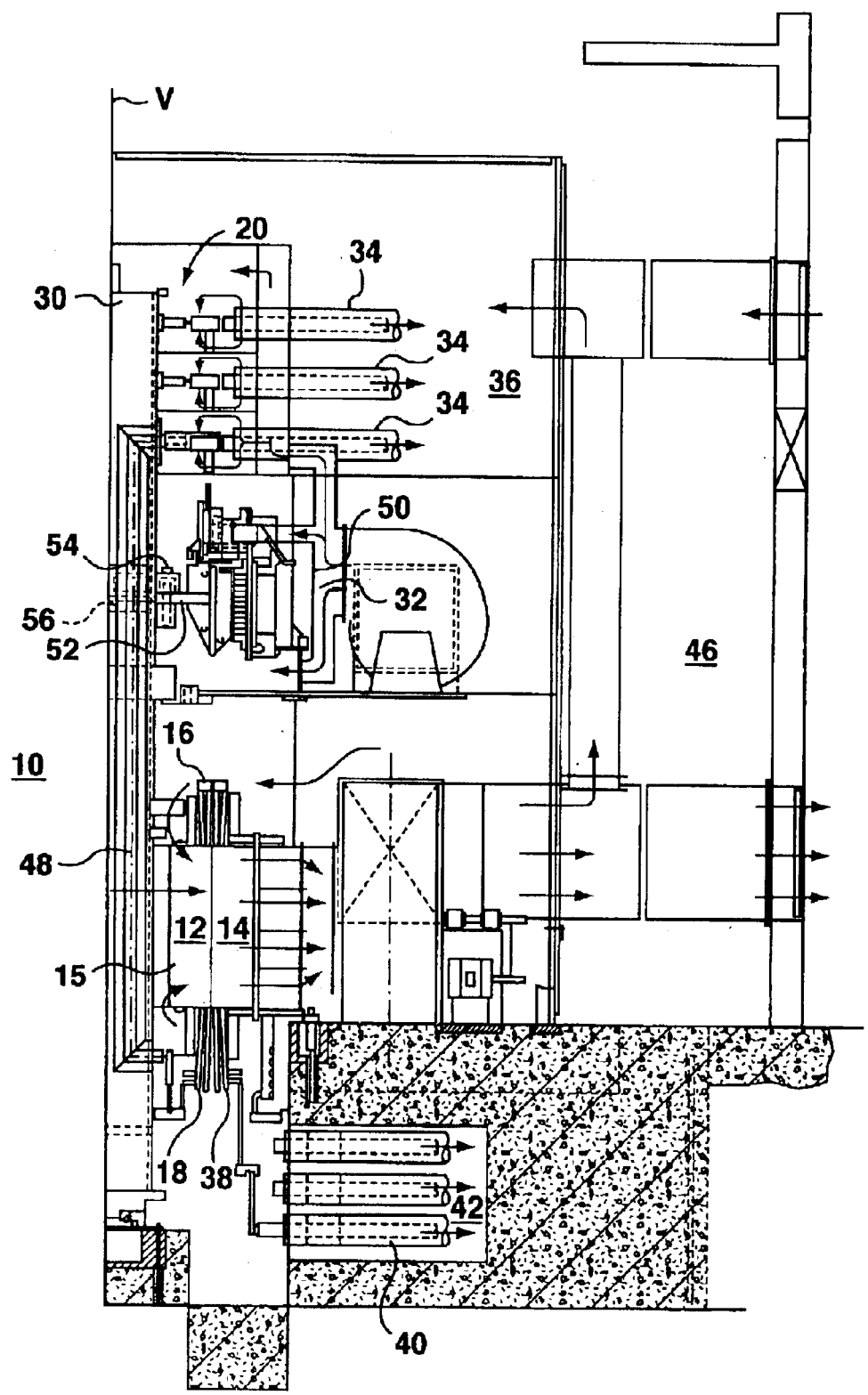
FIG. 1 is a side sectional view of an example rotating transformer system according to an embodiment of the invention.

Referring to FIG. 1 there is shown a rotary transformer 10 which includes both the rotor assembly 12 and a stator 14. The rotor assembly 12 includes a rotor core section 15, first and second rotor end windings 16, 18 slip rings or collector rings 20, and a rotatable shaft assembly 30. Rotor assembly 12 is rotatable about a vertical centreline axis V of its rotatable shaft assembly 30 in both a clockwise direction and the counterclockwise direction. Rotation of rotor assembly 12 is effected by a drive motor 32 coupled to the rotatable shaft assembly 30. It should be understood that while the preferred embodiment shows a vertically orientated shaft assembly 30, the orientation of the shaft assembly 30 may be along another axis such as, for example, a horizontal axis. Further, it should be understood that while the preferred embodiment is directed to application in a rotary transformer, the present invention may be utilized in other applications involving rotating machines.

The rotary transformer 10 is a high voltage, high current environment of alternating voltage and current. Rotary transformer system 10 is connected to transfer electrical power between first electrical system (example first electrical grid) and a second electrical system (for example a second electrical grid). The first electrical grid operates at a first power and first frequency and the second electrical grid operates at a second frequency.

In this environment, the rotor assembly 12 is connected by three phase lines of the bus ducts 34 of the first electrical system 36 and the stator windings 38 are connected to the bus ducts 40 of the second electrical system 42. It should be understood that the first and second electrical systems 36, 42 are shown as the end portions of respective bus ducts 34 and 40. In the environment of the rotary transformer 10, it should be understood that the electrical grids 36, 42 would constitute continuations of the bus ducts 34, 40 within the building structure 46.

Drive motor 32 drives its rotor 50 mounted on rotor support frame spider 52 which in turn is mounted on rotor shaft coupling flange 56 by bolts 54 to thereby rotate shaft assembly 30 and rotary transformer rotor 12. Drive motor 32 operates in response to a drive signal generated by an unillustrated control system. The first and second electrical systems 36, 42 may have a different electrical characteristic such as frequency or phase. The control system is bi-directionally operable to rotate the rotary transfer system at a variable speed for transferring power from the first electrical system to the second electrical system or vice versa.

Three phase isolated bus ducts 48 are mounted within the rotatable shaft 30 and extend axially along the shaft 30 between the slip ring assembly 20 and the second rotor end windings 18 to electrically interconnect the slip ring assembly 20 to the second rotor end windings 18.

The present invention relates to the manner in which rotor shaft coupling, in close proximity of rotor connecting flange 56, forms part of the shaft assembly 30. As can best be seen in FIGS. 2 to 4, the shaft assembly 30 comprises first and second hollow shafts 60, 62 axially aligned with each other and mounted to rotor coupling flange 56. This mounting arrangement has been referred to throughout the specification as the dual shaft and rotating machine coupling.

In FIGS. 2 to 4, the first rotatable shaft 60 has a first shaft connecting flange 64 radially extending outwardly from a first end portion 66. The first shaft connecting flange 64 has a first series of apertures 68 radially spaced around and axially passing through the first shaft connecting flange 64. The first shaft connecting flange 64 has opposing first axially inner and axially outer surface portions 70, 72, respectively.

The rotor coupling flange 56 is coupled to first shaft 60. Rotor coupling flange 56 has rotor spider 74 and a rotor connecting flange 76 radially extending inwardly from rotor spider 74. The rotor connecting flange 76 has a second series of apertures radially 78 spaced around and axially passing through the rotor connecting flange 76. The rotor connecting flange 76 has opposing first and second surface portions 80, 82 respectively. The first surface portion 80 abuts the first axially inner surface portion 70 of the first shaft connecting flange 64 with the first and second series of apertures 68, 78 being aligned with each other.

A plurality of pairs of coupling nuts 84 are mounted by corresponding coupling studs 86. Each pair of coupling nuts 84 are mounted respectively on the second surface portion 82 of the rotor connecting flange 76 and the first axially outer surface portion 72 of the first shaft connecting flange 64. The coupling studs 86 passing through the aligned first and second series of apertures 68, 78 to interconnect the plurality of pairs of coupling nuts 84 to couple the first shaft connecting flange 64 to the rotor connecting flange 76. The coupling studs 86 each having a threaded stem 90 that extends axially from a respective coupling nut 84 mounted to the second surface portion 82 of the rotor connecting flange 76.

The second rotatable shaft 62 is axially aligned with the first rotatable shaft 60. The second shaft 62 has a second shaft connecting flange 92 radially extending outwardly from a second end portion 94 thereof. The second shaft connecting flange 92 has an axially outer surface portion 95 and a pair of co-planar axially inner surface portions 96 radially spaced from each other by an annular groove 98 providing a recessed axially inner surface portion 100 spaced from the co-planar surface portions 96 by a predetermined distance. The recessed axially inner surface portion 100 has a third series of apertures 102 radially spaced around and axially passing through the second shaft connecting flange 92. The pair of co-planar axially inner surface portions 96 abut the second surface portion 82 of the rotor connecting flange 76. Threaded extensions 90 of the coupling studs 86 pass through the third series of apertures 102 in the second shaft connecting flange 92. The recessed axially inner surface portion 100 is spaced to clear the coupling nuts 84 mounted to the second surface portion 82 of the rotor shaft connecting flange 76.

A third set of coupling nuts 104 are each fastened to the threaded extensions 90 of the coupling studs 86 passing through the third series of apertures 102 to couple the second shaft connecting flange 92 to the rotor connecting flange 76.

As shown in FIGS. 2 to 4 the first and second shaft connecting flanges 64, 92 are annular in shape and respectively extend radially outward of the first and second shafts 60, 62, respectively.

The first and second shafts 60, 62 have inner walls 110, 112, respectively, of a predetermined diameter and the rotor connecting flange 76 has an inner diameter wall 116 corresponding to said predetermined diameter whereby walls 110, 112 and 116 are contiguous. It should be noted that in order to provide shaft alignment at the coupling, in may be advantageous to include spigots in each mating component; namely first shaft connecting flange 64, rotor connecting flange 76, and in close proximity to the axially inner surface 96 on the second shaft. Use of spigots in this location will require shaft walls 110, 112 and 116 to have slightly different diameters and, hence, be noncontiguous. Therefore, if spigots are used to provide shaft alignment at the coupling, then it would be desirable to have shaft walls 110, 112, and 116 very close to the same diameter.

The rotor connecting flange 76 has an outer diameter greater than the outer diameters of the first and second shaft connecting flanges 64, 92.

It should be understood that alternative embodiments of the present invention may be readily apparent to a person skilled in the art in view of the above description for the preferred embodiments of this invention. Accordingly, the scope of the present invention should not be limited to the teachings of the preferred embodiments and should be limited to the scope of the claims that follow.

What is claimed is:

1. A dual shaft and rotating machine coupling comprising:
   a first rotatable shaft having a first shaft connecting flange radially extending outwardly therefrom;
   a second rotatable shaft axially aligned with the first rotatable shaft and having a second shaft connecting flange radially extending outwardly therefrom, the second shaft connecting flange being spaced from the first shaft connecting flange; and,
   a rotating machine rotor coupling having a rotor spider and a rotor connecting flange radially extending inwardly from the spider securely sandwiched between and in abutting relation with the first and second shaft connecting flanges.

2. The coupling of claim 1 further including
   a plurality of coupling studs extending from the first shaft connecting flange through the rotor connecting flange; each coupling stud having a coupling fastener mounted thereon against the rotor connecting flange to couple the rotor connecting flange to the first shaft connecting flange; and;
   additional fasteners each fastened to the coupling studs and against the second shaft connecting flange to couple the second shaft connecting flange to the rotor connecting flange.

3. The coupling of claim 2 wherein the second shaft connecting flange has an axially outer surface portion and a pair of co-planar axially inner surface portions radially spaced from each other by a groove providing a recessed axially inner surface portion spaced from the co-planar surface portions by a predetermined distance, and the pair of co-planar axially inner surface portions abutting the rotor connecting flange.

4. The coupling of claim 3 wherein the coupling studs pass through the second shaft connecting flange with the recessed inner surface portion being spaced to clear the coupling fasteners in contact with the rotor connecting flange.

5. A dual shaft and rotating machine coupling comprising:
   a first rotatable shaft having a first shaft connecting flange radially extending therefrom, and the first shaft connecting flange having opposing first axially inner and axially outer surface portions;
   a rotating machine rotor coupling having a rotor spider and a rotor connecting flange radially extending from the spider, and the rotor connecting flange having opposing first and second surface portions;
   a plurality of coupling studs extending from the first shaft connecting flange through the rotor connecting flange; each coupling stud having a coupling fastener mounted thereon against the second surface portion of the rotor connecting flange to couple the first surface portion of the rotor connecting flange to the first axially inner surface portion of the first shaft connecting flange;

a second rotatable shaft axially aligned with the first rotatable shaft and having a second shaft connecting flange radially extending therefrom, the second shaft connecting flange having a second axially outer surface portion and a pair of co-planar axially inner surface portions radially spaced from each other by a groove providing a recessed axially inner surface portion spaced from the co-planar surface portions by a predetermined distance, the pair of co-planar axially inner surface portions abutting the second surface portion of the rotor connecting flange with the coupling studs passing through the second shaft connecting flange and with the recessed inner surface portion being spaced to clear the coupling fasteners; and additional fasteners each fastened to the coupling studs and against the second axially outer surface portion of the second shaft connecting flange to couple the second shaft connecting flange to the rotor connecting flange.

6. The coupling of claim 5 wherein the first and second shaft connecting flanges radially extend from respective end portions of the first and second rotatable shafts.

7. The coupling of claim 6 wherein the first and second shaft connecting flanges are annular in shape and respectively extend radially outward of the first and second shafts.

8. The coupling of claim 7 wherein the rotor connecting flange is annular in shape and extends radially inward of the rotor spider.

9. The coupling of claim 8 wherein the first and second shafts have an inner wall of a predetermined diameter and the rotor connecting flange has an inner diameter substantially corresponding to said predetermined diameter to accommodate shaft aligning spigots.

10. The coupling of claim 8 wherein the inner wall diameter of the first shaft is very close to and not equal to the inner wall diameter of the second shaft, and the rotor connecting flange also has an inner diameter very close and not equal to the inner wall diameters of the first and second shafts.

11. The coupling of claim 9 wherein the rotor connecting flange has an outer diameter greater than the outer diameters of the first and second shaft connecting flanges.

12. A dual shaft and rotating machine coupling comprising:

a first rotatable shaft having a first shaft connecting flange radially extending from a first end portion thereof, the first shaft connecting flange having a first series of apertures radially spaced around and axially passing through the first shaft connecting flange, and the first shaft connecting flange having opposing first axially inner and axially outer surface portions;

a rotating machine rotor coupling having a rotor spider and a rotor connecting flange radially extending from the rotor spider, the rotor connecting flange having a second series of apertures radially spaced around and axially passing through the rotor connecting flange, the rotor connecting flange having opposing first and second surface portions, and the first surface portion of the rotor connecting flange abutting the first axially inner surface portion of the first shaft connecting flange with the first and second series of apertures being aligned with each other;

a plurality of pairs of coupling fasteners and corresponding coupling studs for mounting each pair of coupling fasteners respectively on the second surface portion of the rotor connecting flange and the first axially outer surface portion of the first shaft connecting flange, the coupling studs passing through the aligned first and second series of apertures to interconnect the plurality of pairs of coupling fasteners to couple the first shaft connecting flange to the rotor connecting flange, and the coupling studs each having a threaded stem that extends axially through a respective coupling fastener mounted to the second surface portion of the rotor connecting flange;

a second rotatable shaft axially aligned with the first rotatable shaft and having a second shaft connecting flange radially extending from a second end portion thereof, the second shaft connecting flange having an axially outer surface portion and a pair of co-planar axially inner surface portions radially spaced from each other by an annular groove providing a recessed axially inner surface portion spaced from the co-planar surface portions by a predetermined distance, the recessed axially inner surface portion having a third series of apertures radially spaced around and axially passing through the second shaft connecting flange, and the pair of co-planar axially inner surface portions abutting the second surface portion of the rotor connecting flange with the threaded extensions of the coupling studs passing through the third series of apertures in the second shaft connecting flange and with the recessed axially inner surface portion being spaced to clear the coupling fasteners mounted to the second surface portion of the rotor shaft connecting flange; and a third set of coupling fasteners each fastened to the threaded extensions of the coupling studs passing through the third series of apertures to couple the second shaft connecting flange to the rotor connecting flange.

13. The coupling of claim 12 wherein the first and second shaft connecting flanges are annular in shape and respectively extend radially outward of the first and second shafts.

14. The coupling of claim 13 wherein the rotor connecting flange is annular in shape and extends radially inward of the rotor spider.

15. The coupling of claim 14 wherein the first and second shafts have an inner wall of a predetermined diameter and the rotor connecting flange has an inner diameter substantially corresponding to said predetermined diameter.

16. The coupling of claim 14 wherein the inner wall diameter of the first shaft is very close to and not equal to the inner wall diameter of the second shaft, and the rotor connecting flange also has an inner diameter very close to and not equal to the inner wall diameters of the first and second shafts.

17. The coupling of claim 14 wherein the rotor connecting flange has an outer diameter greater than the outer diameters of the first and second shaft connecting flanges.

18. A rotary transformer system for transferring power between a first grid and a second grid, the first grid operating at a first power wattage and a first electrical frequency and the second grid operating at a second electrical frequency, the system comprising:

a first rotatable shaft having a first shaft connecting flange radially extending outwardly therefrom, and the first shaft connecting flange having opposing first inner and outer surface portions;

a drive motor connected to the rotatable shaft to drive the shaft proportional to power compensation between the first and second grids, the drive motor having a rotor coupling having a rotor spider and a rotor connecting flange radially extending inwardly from the rotor spider, and the rotor connecting flange having opposing first and second surface portions;

a plurality of coupling studs extending from the first shaft connecting flange through the rotor connecting flange; each coupling stud having a coupling fastener mounted thereon against the second surface portion of the rotor connecting flange to couple the first surface portion of the rotor connecting flange to the first axially inner surface portion of the first shaft connecting flange;

a second rotatable shaft axially aligned with the first rotatable shaft and having a second shaft connecting flange radially extending outwardly therefrom, the second shaft connecting flange having an axially outer surface portion and a pair of co-planar axially inner surface portions radially spaced from each other by a groove providing a recessed axially inner surface portion spaced from the co-planar surface portions by a predetermined distance, the pair of co-planar axially inner surface portions abutting the second surface portion of the rotor connecting flange with the coupling studs passing through the second shaft connecting flange and with the recessed axially inner surface portion being spaced to clear the coupling fasteners;

additional fasteners each fastened to the coupling studs to couple the second shaft connecting flange to the rotor connecting flange;

a rotor assembly having a rotor connected with the second rotatable shaft, and the rotor assembly having rotor end windings extending axially from opposing ends of the rotor;

a stator assembly surrounding the rotor and having stator windings electrically connected with the second grid;

a slip ring assembly mounted to the first rotatable shaft and being electrically connected to the first grid; and, a bus duct assembly mounted within the rotatable shaft and extending from the slip ring assembly to one of the rotor end windings to electrically interconnect the slip ring assembly to one of rotor end windings.

* * * * *

UNITED STATES PATENT AND TRADEMARK OFFICE
CERTIFICATE OF CORRECTION

PATENT NO. : 6,837,644 B2
DATED : January 4, 2005
INVENTOR(S) : White et al.

It is certified that error appears in the above-identified patent and that said Letters Patent is hereby corrected as shown below:

Title page,
Item [30], Foreign Application Priority Data, should be -- 2,389,483 -- not "2839483".

Signed and Sealed this

Tenth Day of May, 2005

JON W. DUDAS
*Director of the United States Patent and Trademark Office*